United States Patent [19]

Nawata

[11] Patent Number: 5,691,983

[45] Date of Patent: Nov. 25, 1997

[54] COMMUNICATION SYSTEM WITH REPEATEDLY ALLOCATED CHANNEL ID NUMBERS

[75] Inventor: Hizuru Nawata, Tokyo, Japan

[73] Assignee: NEC Corporation, Tokyo, Japan

[21] Appl. No.: 657,774

[22] Filed: May 31, 1996

[30] Foreign Application Priority Data

May 31, 1995 [JP] Japan ................... 7-156899

[51] Int. Cl.$^6$ ................ H04J 1/02; H04Q 7/00
[52] U.S. Cl. ........... 370/344; 370/496; 455/34.1
[58] Field of Search ................ 370/69.1, 70, 57, 370/76, 480, 484, 487, 496, 319, 343, 344; 455/130, 161.1, 161.2, 192.1, 192.2, 150.1, 60, 62, 34.1, 103, 255, 257, 258; 375/316, 344

[56] References Cited

U.S. PATENT DOCUMENTS

| | | | |
|---|---|---|---|
| 4,317,215 | 2/1982 | Tabata et al. | 455/5 |
| 5,077,828 | 12/1991 | Waldroup | 455/34 |
| 5,093,924 | 3/1992 | Toshiyuki et al. | 455/33 |
| 5,263,176 | 11/1993 | Kojima et al. | 455/34.1 |

FOREIGN PATENT DOCUMENTS 0313054  4/1989  European Pat. Off. .
0324420  7/1989  European Pat. Off. .
5-336017  12/1993  Japan .

OTHER PUBLICATIONS

Patent Abstracts of Japan, vol. 18, No. 165 (E-1527), Mar. 18, 1994.

Primary Examiner—Hassan Kizou
Assistant Examiner—Kwang Bin Yao
Attorney, Agent, or Firm—Sughrue,Mion,Zinn,Macpeak & Seas, PLLC

[57] ABSTRACT

An available frequency range previously assigned to the communication system is divided into a plurality of subranges each including a plurality of frequency channels to which channel identifiers are assigned, respectively. The channel identifiers are repeatedly assigned to all the frequency channels in the subranges. In such a channel assignment, a transmitting side transmits a signal including a desired channel identifier corresponding to a desired frequency channel. At a receiving side, after detecting a frequency acquisition of the demodulator, the desired channel identifier is detected based on the received signal when the frequency acquisition of the demodulator is detected. When the frequency acquisition of the demodulator is detected and the desired channel identifier is detected, a local oscillation frequency sweeping for demodulator is locked to receive the signal from the transmitting side.

19 Claims, 4 Drawing Sheets

| | TRANSMISSION DATA 1 | TRANSMISSION DATA 2 | |

| | UW | IDj | TRANSMISSION DATA 1 | UW | IDj | TRANSMISSION DATA 2 | |

COMMUNICATION SYSTEM WITH REPEATEDLY ALLOCATED CHANNEL ID NUMBERS

BACKGROUND OF THE INVENTION

1. Field of the Invention

The present invention relates to a communication system which enables a plurality of subscribers to communicate with each other through frequency channels selected from a plurality of frequency channels within a predetermined frequency range.

2. Description of the Related Art

In FDMA (frequency division multiple access) communications, for example, satellite communications of relatively low bit rates, a receiver is generally provided with a local oscillator comprising an oscillator having a large frequency step and a sweep oscillator for fine adjustment. A desired channel is found among a plurality of frequency channels by the local oscillator sweeping a local oscillation frequency, and a received signal through the desired channel is demodulated by a demodulator. However, in the case where a frequency channel step is narrow as in a low-bit rate communication, a sweep width of the local oscillation frequency is wider than the frequency channel step, which may cause the demodulator to be locked into another channel frequency during the sweeping.

In order to avoid this, a receiver for the FDMA system has been proposed in Japanese Patent Laid-open Publication No. 5-336017, wherein a peculiar identification number (channel ID number) is determined for every channel frequency. This receiver performs the following receiving control. When receiving the channel ID number together with transmission data, the receiver checks whether the received channel ID number is identical to the desired ID number at demodulation. If not, the local oscillation frequency of the local oscillator is sequentially swept until the desired channel is found.

However, according to the conventional communication method mentioned above, it is necessary to give ID numbers to all the frequency channels which can be used in the system. Therefore, in the system having a large number of frequency channels, an amount of information necessary for channel identification, that is, the number of bats for each ID number, becomes increasingly large, resulting in increased transmission loss. Moreover, if the number of bits allocate for each ID number increases, an ID detection circuit necessitates registers having a large number of bits, resulting in a complicated and costly circuit arrangement.

Needless to say, the lower the transmission rate, the larger the transmission loss due to the above-mentioned ID number allocation. For instance, if the frequency range which can be used in the system is 500 MHz and a frequency channel step is set to 50 KHz, a maximum of 10,000 channels can be allocated in this system. If an ID number is assigned to each of these frequency channels, at least 14 bits are needed. In the case where a frequency channel step can be lowered to 25 KHz due to slower transmission rate, a maximum of 20,000 channels can be allocated. To identify such a large number of channels, at least 15 bits for an ID number are allocated in each transmission signal, further causing an increase of transmission loss. Moreover, at the receiver, it is necessary to provide the comparison circuit with registers for storing 15-bit ID data, resulting in the increased amount of hardware and the complicated circuitry in the receiver.

SUMMARY OF THE INVENTION

An object of the present invention is to provide a communication system which achieves reduced transmission losses in predetermined frequency channels.

Another object of the present invention is to provide a communication system which achieves the reduced number of bits allocated to identify the respective frequency channels.

Still another object of the present invention is to provide a receiver which enables locking into a desired frequency channel with a simple circuit configuration and a reduced power consumption.

According to the present invention, a predetermined number of frequency channels within a predetermined frequency range assigned to the system are divided into a plurality of channel groups, wherein each of the channel groups has a predetermined set of channel identifiers which are repeatedly assigned to the frequency channels in the channel groups. The predetermined set of channel identifiers are assigned frequency channels included in each of the channel groups, respectively. In other words, the predetermined number of frequency channels are arranged such that a predetermined frequency range previously assigned to the communication system is logically divided into a plurality of subranges. Each of the subranges includes a plurality of frequency channels to which channel identifiers are assigned, respectively. The channel identifiers are repeatedly assigned to the predetermined number of frequency channels in the subranges.

In such a channel assignment, a transmitting side transmits a signal through a desired frequency channel, the signal including a desired channel identifier corresponding to the desired frequency channel. A receiving side specifies the desired frequency channel based on a demodulator frequency acquisition and the desired channel identifier included in a received signal.

More specifically, the transmitting side includes a combiner which combines transmission data with the desired channel identifier to form the signal and a transmitter which transmits the signal through the desired frequency channel. The desired channel identifier corresponds to the desired frequency channel. The receiving side includes a demodulator for demodulating received data from a received signal and a demodulator detector for detecting a frequency acquisition of the demodulator. Further, a channel identifier detector is provided to detect the desired channel identifier based on the received signal when the frequency acquisition of the demodulator is detected. When the frequency acquisition of the demodulator is detected and the desired channel identifier is detected based on the received signal, a sweep controller sweeps an oscillation frequency and locks the oscillation frequency to receive the signal from the transmitting side.

It is preferable that the receiving side specify the desired frequency channel based on the demodulator frequency acquisition, the desired channel identifier, and a unique word which are both included in the received signal. In this case, after detecting the unique word based on the received signal when the frequency acquisition of the demodulator is detected, the desired channel identifier is detected based on the received signal.

As described above, according to the present invention, each of the channel groups has the predetermined channel identifiers which are repeatedly assigned to the frequency channels in the channel groups. In other words, the channel identifiers are repeatedly assigned to the predetermined number of frequency channels in the subranges. Therefore, it is possible to decrease the amount of information or the number of bits required for a channel identifier allocated in a transmitted signal, resulting in the suppressed transmission loss. Moreover, since the number of bits allocated for channel identification is reduced, the circuitry configuration of the channel identifier detector can be realized with a smaller amount of hardware.

DETAILED DESCRIPTION OF THE PREFERRED EMBODIMENTS

Figure 1:
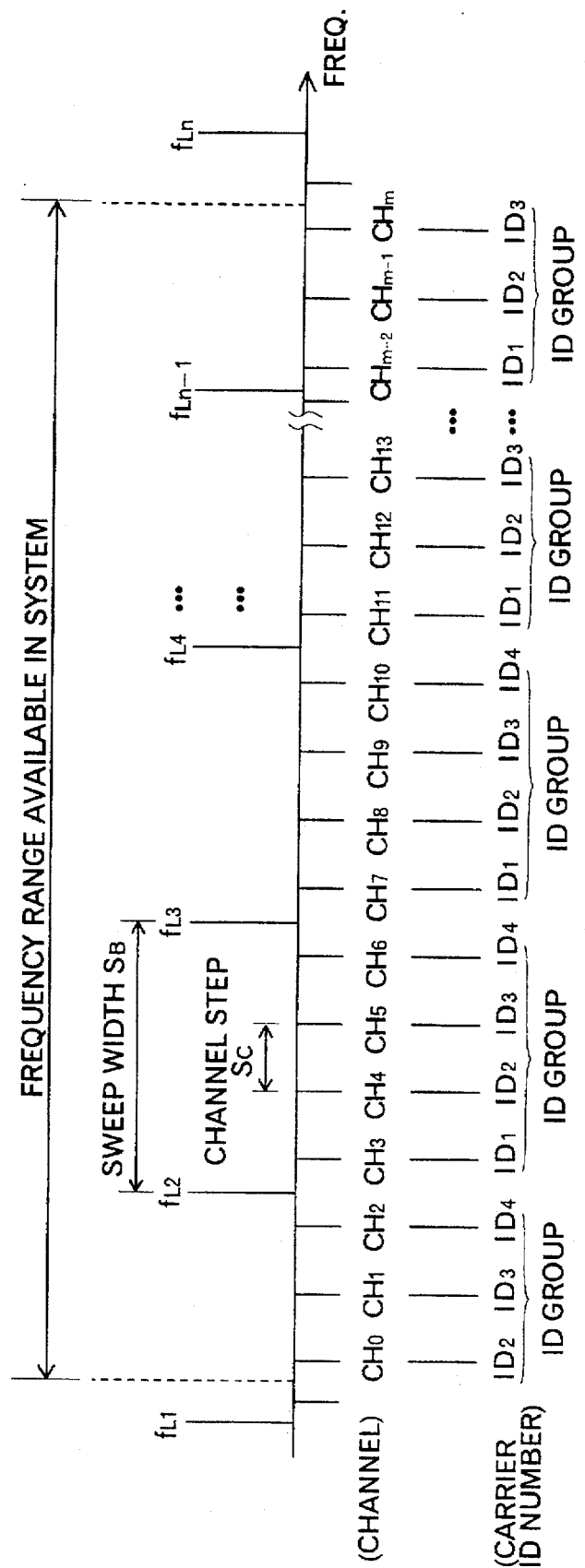
FIG. 1 is a schematic diagram showing a simplified ID number allocation to explain ID groups according to an embodiment of the present invention.

Referring to FIG. 1, in FDMA system, M frequency channels ($CH_o$–$CH_m$) are previously arranged within a predetermined frequency range which is logically divided into (n−1) frequency bands $f_{L3}$–$f_{L2}$, $f_{L2}$–$f_{L3}$, $f_{L3}$–$f_{L4}$, ... $f_{Ln-1}$–$f_{Ln}$). At each receiving side, a sweep width $S_B$ of a local oscillator is set equally to a predetermined one of the frequency bands. For simplicity, in this figure, each frequency band or sweep width $S_B$ includes four frequency channels to which four predetermined identification numbers $ID_1$–$ID_4$ (hereinafter referred to as an ID group) are assigned, respectively. For instance, the frequency channels $CH_3$, $CH_4$, $CH_5$, and $CH_6$ are included in the frequency band $f_{L2}$–$f_{L3}$ corresponding to the sweep width $S_B$, and the identification numbers $ID_1$, $ID_2$, $ID_3$, and $ID_4$, of the ID group are assigned to the frequency channels $CH_3$, $CH_4$, $CH_5$, and $CH_6$, respectively.

The ID group comprising four predetermined identification numbers $ID_1$–$ID_4$ is used repeatedly in all frequency bands as shown in FIG. 1. Since the sweep range of the local oscillator is generally restricted to some degree by phase noise and the like, the sweep frequency range is, for instance, about one hundredths to one thousandths of the frequency range available in the system. In this case, hundreds to thousands frequency bands would be included in the available frequency range in the system, and the ID group is repeatedly used hundreds to thousands times in the available frequency range. Therefore, each of the frequency channels within the available frequency range can be identified with only four identification numbers $ID_1$–$ID_4$. More specifically, the receiver can identify a single frequency channel by specifying a frequency band which is previously designated and checking whether a detected identification number is identical to a desired identification number of the ID group. Since only four identification numbers $ID_1$–$ID_4$ are needed, only 2 bits as information for channel identification are allocated to the transmission signal. In the case where the ID group consists of N identification numbers, needless to say, M bits are needed to identify each of the IDs, where $N=2^M$.

RECEIVING SIDE

Figure 2:
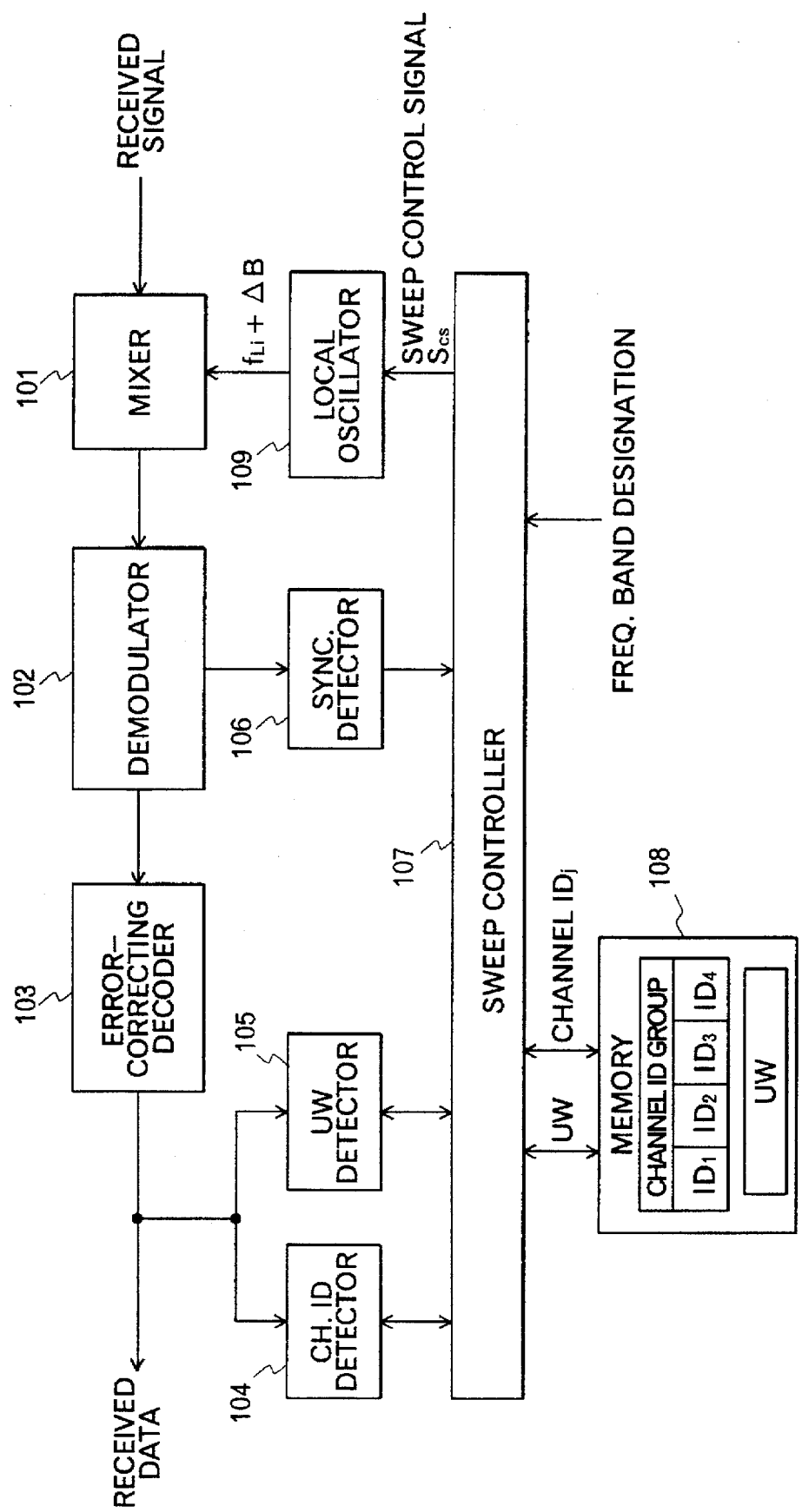
FIG. 2 is a block diagram showing the partial circuit of a receiver according to the embodiment of the present invention.

Referring to FIG. 2, in a receiver of the FDMA system according to the present invention, receive data is obtained by a mixer 101, a demodulator 102, and an error-correcting decoder 103, and a channel identification number ID included in the receive data is specified by a channel ID detector 104. Moreover, the establishment of synchronization is detected by a UW (unique word) detector 105, and the synchronization of the demodulator 102 or demodulator acquisition is detected by a synchronization detector 106. A sweep controller 107 performs synchronization control, sweep control for channel searching, etc. with reference to a memory 108 which stores the predetermined channel ID group consisting of $ID_2$–$ID_4$ and the unique word UW. A local oscillator 109 outputs a local oscillation frequency, $f_{Li}+\Delta$ B, to the mixer 101 under control of the sweep controller 107. The local oscillation frequency $f_{Li}+\Delta$ B is changed in minute steps from a designated frequency $f_{Li}$ according to a sweep control signal $S_{cs}$.

More specifically, a received signal of a radio frequency (RF) is received by an antenna (not shown in the figure) and is transferred to the mixer 101. The mixer 101 multiplies the received signal by the local oscillation frequency $f_{Li}+\Delta$ B to convert it from the radio frequency to an intermediate frequency (IF). The IF received signal is demodulated to a baseband signal by the demodulator 102, and the baseband signal is decoded by the error correcting decoder 103 to obtain the receive data.

The synchronization of the demodulator 102 is detected by the synchronization detector 106. There have been proposed several demodulator acquisition schemes. For example, a reencoding acquisition determination scheme may be employed in this embodiment.

After the sweep controller 107 reads a channel ID number $ID_j$ indicating the desired frequency channel and the unique word UW from the memory 108, the ID detector 104 and the UW detector 105 detect the desired channel identification number and the desired unique word UW from the receive data, respectively. In accordance with these detection results, the sweep controller 107 generates a sweep control signal $S_{cs}$. According to this sweep control signal $S_{cs}$, the output frequency $f_{Li}+\Delta$ B of the local oscillator 109 varies within the sweep width $S_B$. When the second frequency band, for instance, is designated, the output frequency $f_{L2}+\Delta$ B of the local oscillator 109 varies within the range $f_{L2}$–$f_{L3}$ in accordance with the sweep control signal $S_{cs}$.

The local oscillator 109 may be comprised of a frequency synthesizer and a sweep oscillator. The frequency synthesizer is set at a sweep starting frequency $f_{Li}$ (i=1, 2, ..., n−1) which is previously designated by a receiving controller (not shown) and outputs the local oscillation frequency $f_{Li}+\Delta$ B according to a sweep oscillation frequency generated by the sweep oscillator. The sweep starting frequency may be set at the center of a frequency band.

TRANSMITTING SIDE

Figures 3, 4A, 4B:
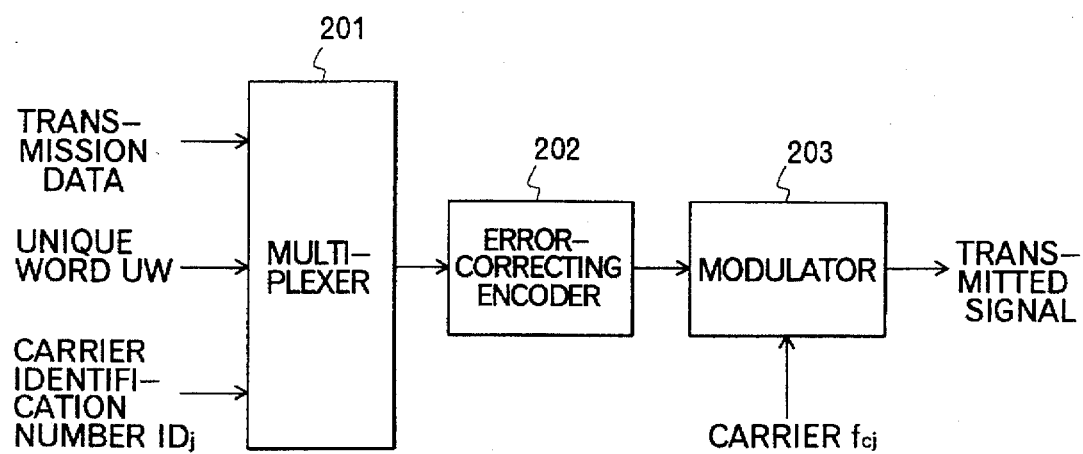
FIG. 3 is a block diagram showing the partial circuit of a transmitter according to the embodiment of the present invention.
FIG. 4A is a format diagram of transmission data in the transmitter as shown in FIG. 3.
FIG. 4B is a format diagram of a transmission signal where an unique word (UW) and an identification number ($ID_j$) corresponding to a transmission frequency channel are written in a header of the transmission signal.

Referring to FIG. 3, a transmitter of the FDMA system according to the present invention is comprised of a multiplexer 201, an error correcting encoder 202, and a modulator 203. In addition, it is provided with a transmission controller and a frequency synthesizer (not shown in the figure). A carrier wave of a desired transmission frequency $f_{cj}$ is generated by the frequency synthesizer and is provided to the modulator 203. A carrier (or channel) identification number $ID_j$ corresponding to the transmission frequency $f_j$ is provided to the multiplexer 201 by the transmission controller. The multiplexer 201 multiplexes the transmission data, the unique word UW, and the identification number $ID_j$ of the transmission carrier wave (frequency channel) in predetermined frames. A multiplexed signal output from the multiplexer 201 is encoded by the error correcting encoder 202, and the encoded signal is output to the modulator 203. For instance, the modulator 203 is a quadrature modulator, and modulates the carrier wave of transmission frequency $f_{cj}$ according to the encoded signal as a modulating signal to produce the transmission signal. In the case where the modulator 203 is a digital modulator, after the output of the digital modulator is converted to an analog form by a digital-to-analog converter, it may be convened up to the transmission frequency $f_{cj}$ by the frequency converter following the digital-to-analog converter.

The transmission data as shown in FIG. 4A is input to the multiplexer 201 at the predetermined frame cycle. The multiplexer 201 writes the unique word UW and the identification number $ID_j$ corresponding to the transmission frequency onto the header of each frame, and forms the transmission signal frame as shown in FIG. 4B.

It should be noted that a terminal of the FDMA system may be comprised of the receiver as shown in FIG. 2 and the transmitter as shown in FIG. 3, wherein a transmitted signal is transmitted by the transmitter through a frequency channel and a received signal is received by the receiver through another frequency channel.

RECEIVING CONTROL

Next, how the receiver receives such a radio signal having a channel identification number $ID_j$ in a certain frequency band corresponding to the transmission frequency will be described in detail with reference to a flowchart. For simplicity, it is assumed that the receiver is set such that the signal can be received from the transmitter through the frequency channel $CH_4$ indicated by the channel identification number $ID_2$ in the frequency band $f_{L2}$-$f_{L3}$, a reference frequency $f_{L2}$ is designated to specify the frequency band $f_{L2}$-$f_{L3}$ and the sweep operation of the local oscillator 109 is performed on the basis of this reference frequency.

Figure 5:
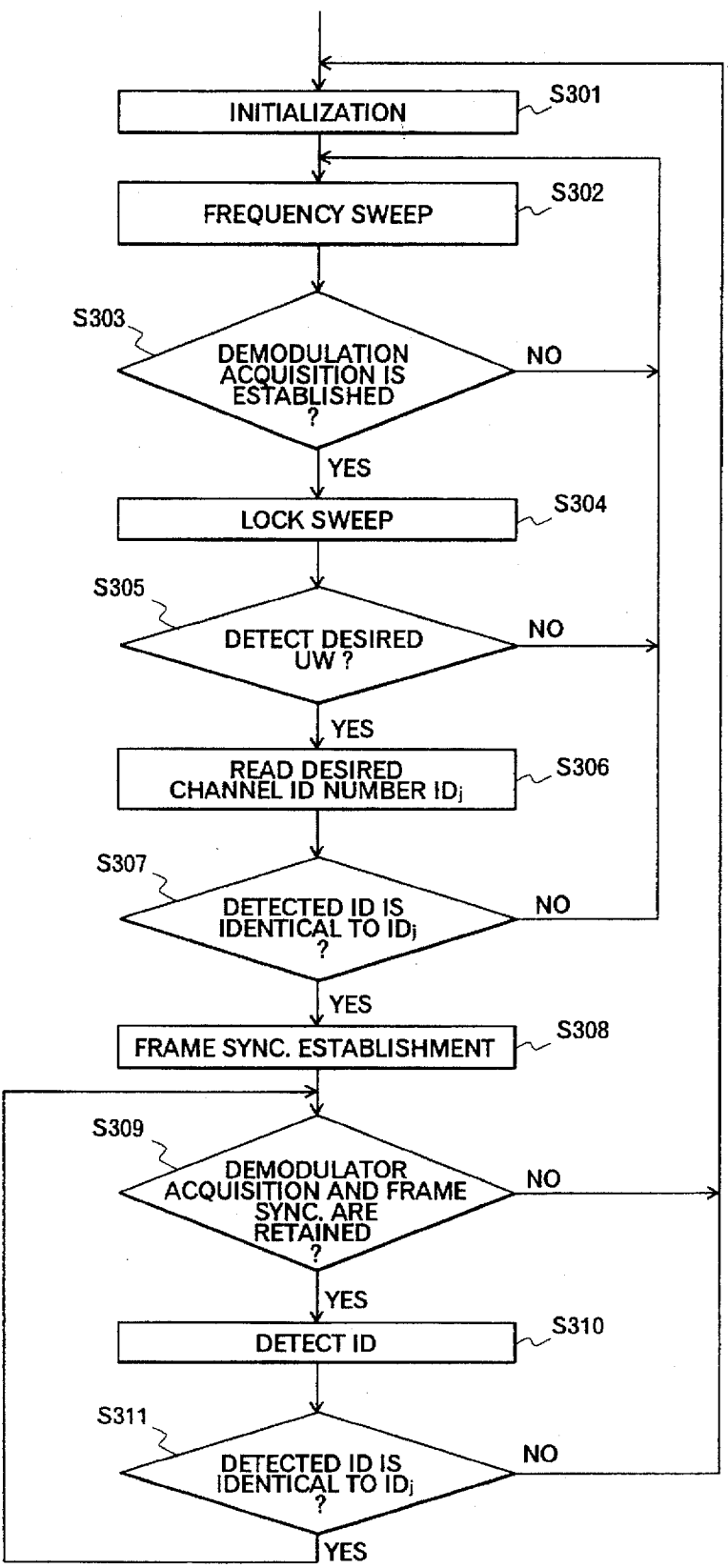
FIG. 5 is a flowchart showing a reception control operation the receiver as shown in FIG. 2.

Referring FIG. 5, after initialized to start the frequency sweep (S301), the sweep controller 107 outputs the sweep control signal $S_{cs}$ to the local oscillator 109 which outputs the local oscillation frequency changing by a predetermined minute step $\Delta$ B from the reference frequency $f_{L2}$ (S302). Subsequently, it is checked by referencing a detection result of the synchronous detector 106 whether the frequency acquisition or synchronization of the demodulator 102 is established at the local oscillation frequency $f_{L2}+\Delta$ B (S303). If the acquisition of the demodulator 102 is not established (No of S303), the sweep controller 107 repeats the frequency sweep step S302 until the demodulator acquisition is established.

When the local oscillator 109 outputs the local oscillation frequency corresponding to the frequency channel $CH_3$ (not $CH_4$) to the mixer 101, the sweep controller 107 is assumed to receive a demodulator acquisition signal from the synchronization detector 106. In this case, the sweep controller 107 determines that the synchronization of the demodulator 102 is established (Yes of S303). When the synchronization of the demodulator has been established, the sweep controller 107 stops the frequency sweep of the local oscillator 109 (S304), and causes the UW detector 105 to detect a unique word UW from the receive data output from the error correcting decoder 103 (S305). If the detected unique word UW is not identical to the desired unique word UW which is stored in the memory 108 (No of S305), the frequency sweep is restarted (step S302), and the frequency sweep is repeated until the demodulator 102 synchronizes and the desired unique word UW is detected.

When the desired unique word UW is detected (Yes of S305), the sweep controller 107 reads the desired channel identification number $ID_2$ from the memory 108 (S306), and the ID detector 104 compares the detected identification number $ID_j$ corresponding to the receiving channel to the desired channel identification number $ID_2$ (S307). If the detected $ID_j$ is not identical to the read identification number $ID_j$ (No of S307), the sweep controller 107 determines that the demodulator 102 synchronizes in another frequency channel, for instance, in the case where the sweep controller 107 receives the demodulator acquisition signal from the synchronization detector 106 when the local oscillator 109 outputs the local oscillation frequency corresponding to the frequency channel $CH_3$ (not $CH_4$) to the mixer 101. In this case, the frequency sweep is further continued (S302). Thus, the sweep controller 107 repeats the frequency sweep of the local oscillator 109 (S302–S307) until the synchronization of the demodulator 102 is established, the unique word UW is detected, and the detected ID is identical to the desired $ID_2$, that is, the desired frequency channel is found (Yes of S307).

After the detected ID is identical to the desired $ID_2$ and the frame synchronization of the receive data is established (S308), it is checked in frames whether the above synchronization is retained. First of all, it is checked whether the demodulator acquisition and the frame synchronization are retained (S309). If they are retained, a channel identification number ID is detected from the receive data (S310). It is further checked whether the detected ID is identical to the desired $ID_j$ (S311). If identical, the synchronization checking steps (S309–S311) are repeated. When neither the demodulator acquisition nor the frame synchronization is maintained, or when the detected ID is not identical to the desired $ID_j$, the sweep controller 107 returns to the initialization step S301.

What is claimed is:

1. A communication system operable over a predetermined frequency range,
   the frequency range having the structure comprising:
   a plurality of channel groups, each of the channel groups having a predetermined set of frequency channels,
   a plurality of channel identifiers, each of said channel identifiers assigned to a predetermined number of frequency channels each of said predetermined number of frequency channels being selected from a respective one of the channel groups,
   wherein said communication system further comprises:
   a transmitting side transmitting a signal through a desired frequency channel, the transmitting side further inserting one of said channel identifiers corresponding to the desired frequency channel into said signal, and
   a receiving side identifying the desired frequency channel based on a demodulator frequency acquisition and the channel identifier inserted by the transmitting side.

2. The communication system according to claim 1, wherein the predetermined frequency range has the structure comprising:
   a plurality of subranges, each of the subranges including a plurality of frequency channels
   a plurality of channel identifiers repeatedly assigned to respective frequency channels in each of the subranges.

3. A receiver in the communication system according to claim 2, comprising:
   sweeping means for sweeping an oscillation frequency within a designated subrange from a reference frequency included in the designated subrange;

mixing means for mixing an oscillation signal of the oscillation frequency with the received signal to produce an intermediate frequency signal;

demodulating means for demodulating received data from the intermediate frequency signal;

first detecting means for detecting a frequency acquisition of the demodulating means;

second detecting means for detecting the desired channel identifier from the received data when the frequency acquisition of the demodulating means is detected; and control means for stopping the sweeping means sweeping the oscillation frequency when the frequency acquisition of the demodulating means is detected and the desired channel identifier is detected based on the received signal.

4. The receiver according to claim 3, wherein the second detecting means comprises:

unique word detecting means for detecting a unique word from the received data when the frequency acquisition of the demodulating means is detected; and identifier detecting means for detecting the desired channel identifier from the received data when the unique word is detected from the received data.

5. The communication system according to claim 1, wherein the transmitting side comprises:

combining means for combining transmission data with the desired channel identifier to form the signal, the desired channel identifier corresponding to the desired frequency channel; and transmitting means for transmitting the signal through the desired frequency channel.

6. The communication system according to claim 5, wherein the receiving side comprises:

a demodulator;

first detecting means for detecting a frequency acquisition of the demodulator;

second detecting means for detecting the desired channel identifier based on the received signal when the frequency acquisition of the demodulator is detected; and sweep control means for sweeping an oscillation frequency and locking the oscillation frequency to receive the signal from the transmitting side when the frequency acquisition of the demodulator is detected and the desired channel identifier is detected based on the received signal.

7. The communication system according to claim 1, wherein the receiving side specifies the desired frequency channel based on the demodulator frequency acquisition, the desired channel identifier, and a unique word which are both included in the received signal.

8. The communication system according to claim 7, wherein the receiving side comprises:

a demodulator;

first detecting means for detecting a frequency acquisition of the demodulator;

second detecting means for detecting the unique word based on the received signal when the frequency acquisition of the demodulator is detected;

third detecting means for detecting the desired channel identifier based on the received signal when the unique word is detected based on the received signal; and sweep control means for sweeping an oscillation frequency and locking the oscillation frequency to receive the signal from the transmitting side when the frequency acquisition of the demodulator is detected, the unique word is detected, and the desired channel identifier is detected based on the received signal.

9. The communication system according to claim 1, comprising a plurality of terminals each comprising a transmitter and a receiver, the transmitter transmitting a transmitted signal through a desired transmitting frequency channel, the transmitted signal including a first channel identifier corresponding to the desired transmitting frequency channel; and the receiver specifying a desired receiving frequency channel based on a demodulator frequency acquisition and a second channel identifier included in a received signal, the second channel identifier corresponding to the desired receiving frequency channel.

10. The communication system according to claim 9, wherein the transmitter comprises:

combining means for combining transmission data with the first channel identifier to form the transmitted signal, the desired channel identifier corresponding to the desired transmitting frequency channel; and transmitting means for transmitting the signal through the desired transmitting frequency channel.

11. The communication system according to claim 9, wherein the receiver comprises:

a demodulator;

first detecting means for detecting a frequency acquisition of the demodulator;

second detecting means for detecting the second channel identifier based on the received signal when the frequency acquisition of the demodulator is detected; and sweep control means for sweeping an oscillation frequency and locking the oscillation frequency to receive the signal from the transmitter when the frequency acquisition of the demodulator is detected and the second channel identifier is detected based on the received signal.

12. A receiver in the communication system according to claim 1, comprising:

a demodulator;

first detecting means for detecting a frequency acquisition of the demodulator;

second detecting means for detecting the desired channel identifier based on the received signal when the frequency acquisition of the demodulator is detected; and sweep control means for sweeping an oscillation frequency and locking the oscillation frequency to receive the signal from the transmitting side when the frequency acquisition of the demodulator is detected and the desired channel identifier is detected based on the received signal.

13. The receiver according to claim 12, wherein the sweep control means comprises:

mixing means for mixing an oscillation signal of the oscillation frequency with the received signal to produce an intermediate frequency signal which is output to the demodulator; and frequency control means for sweeping the oscillation frequency to receive the signal from the transmitting side when the frequency acquisition of the demodulator is detected and the desired channel identifier is detected based on the received signal.

14. The receiver according to claim 12, wherein the second detecting means comprises:

unique word detecting means for detecting a unique word from an output of the demodulator when the demodulator acquires the frequency synchronization; and identifier detecting means for detecting the desired channel identifier from the output of the demodulator when the unique word is detected from the output of the demodulator.

15. In a system for transmitting a signal from a transmitting side to a receiving side through a desired frequency channel, a communication method comprising the steps of:

preparing a channel assignment of the system such that a predetermined frequency range assigned to the system is logically divided into a plurality of subranges, each of the subranges including a plurality of frequency channels to which predetermined channel identifiers are assigned, respectively, and the channel identifiers being repeatedly assigned in the subranges;

at the transmitting side, transmitting a signal through a desired frequency channel, the signal including a desired channel identifier corresponding to the desired frequency channel; and at the receiving side, specifying the desired frequency channel based on a demodulator frequency acquisition and the desired channel identifier included in a received signal.

16. The communication system according to claim 15, wherein the channel assignment is such that a predetermined frequency range previously assigned to the communication system is logically divided into a plurality of subranges, each of the subranges including a plurality of frequency channels to which channel identifiers are assigned, respectively, and the channel identifiers being repeatedly assigned to the predetermined number of frequency channels in the subranges.

17. The communication method according to claim 15, wherein, at the transmitting side, combining transmission data with a desired channel identifier to form the signal, the desired channel identifier corresponding to the desired frequency channel included in a single subrange; and transmitting the signal through the desired frequency channel.

18. The communication method according to claim 15, wherein, at the receiving side, sweeping an oscillation frequency for a demodulator;

detecting a frequency acquisition of the demodulator;

detecting the desired channel identifier based on a received signal when the frequency acquisition of the demodulator is detected; and locking the oscillation frequency to receive the signal from the transmitting side when the frequency acquisition of the demodulator is detected and the desired channel identifier is detected based on the received signal.

19. The communication method according to claim 18, wherein the step of detecting the desired channel identifier comprises the steps of:

detecting a unique word based on the received signal when the frequency acquisition of the demodulator is detected; and detecting the desired channel identifier based on the received signal when the unique word is detected based on the received signal.

* * * * *